Aug. 11, 1942.    W. M. WILLETT ET AL    2,292,981
BATTERY BROODER
Filed Nov. 7, 1940    3 Sheets-Sheet 1

INVENTORS
WILLIAM W. WILLETT
JOHN B. OLSON
GEORGE T. MARKEY
BY A. S. Krob
ATTORNEY

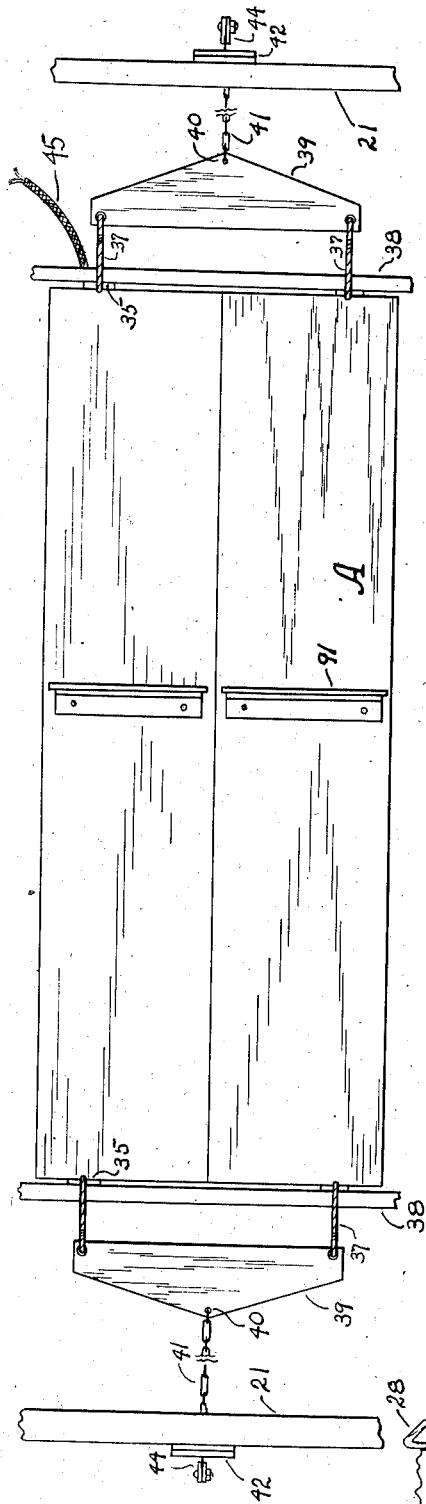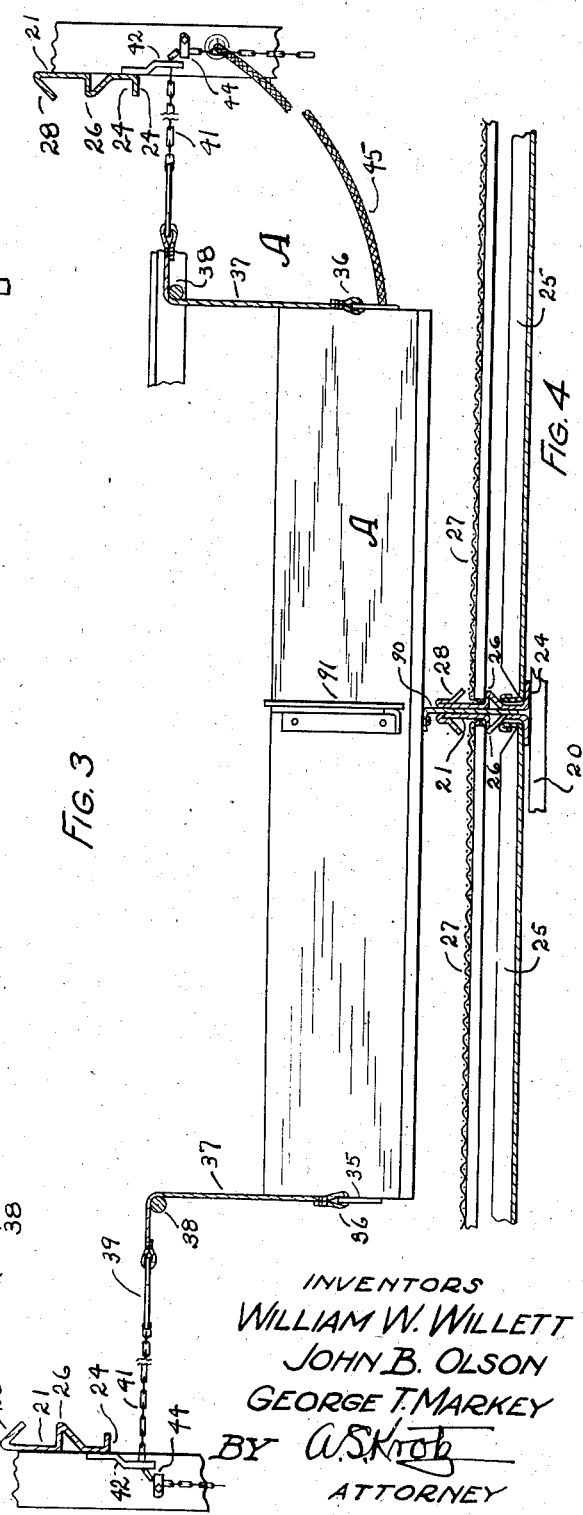

Aug. 11, 1942. W. M. WILLETT ET AL 2,292,981
BATTERY BROODER
Filed Nov. 7, 1940 3 Sheets-Sheet 3
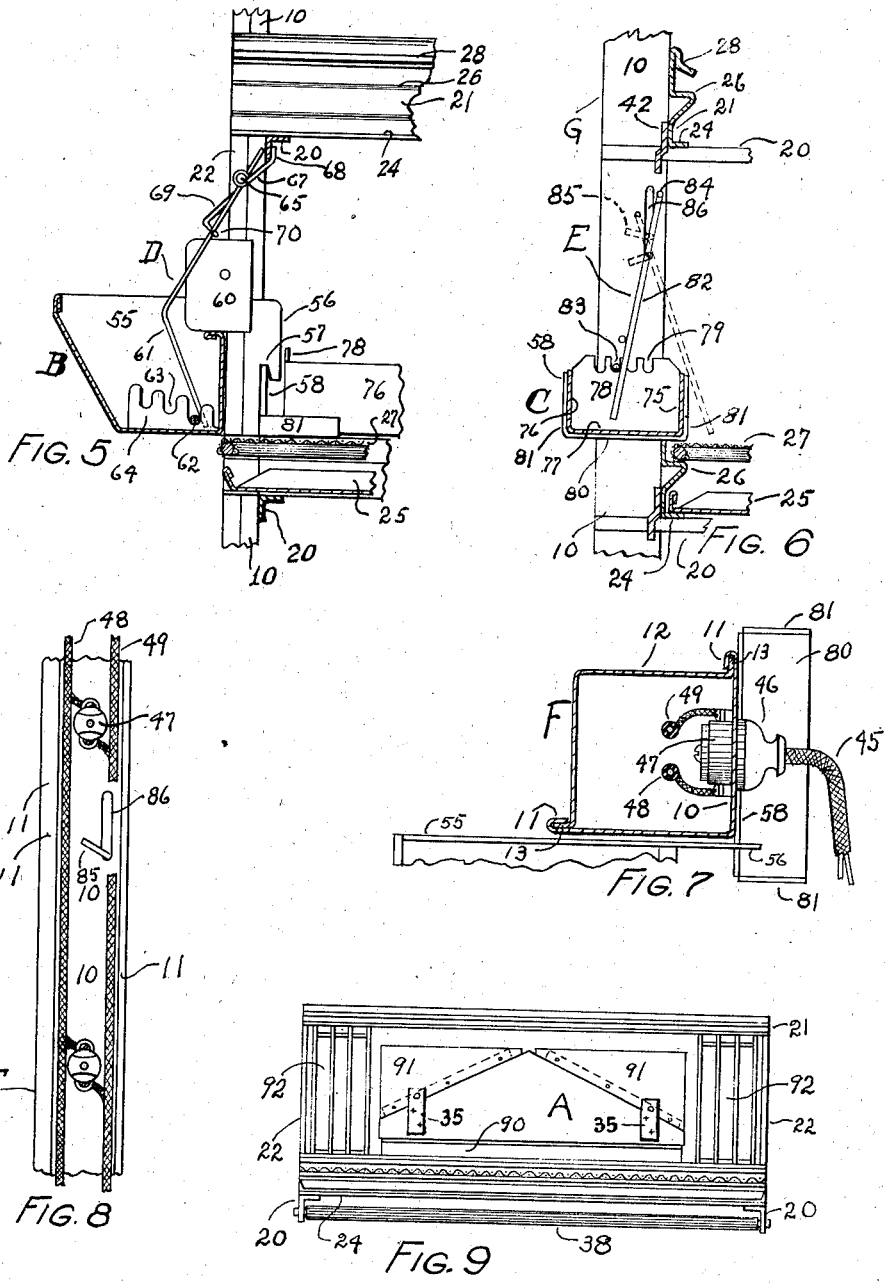

Patented Aug. 11, 1942

2,292,981

UNITED STATES PATENT OFFICE 2,292,981

BATTERY BROODER

William M. Willett, John B. Olson, and George T. Markey, Fort Atkinson, Wis., assignors to James Manufacturing Company, Fort Atkinson, Wis., a company of Wisconsin Application November 7, 1940, Serial No. 364,610

4 Claims. (Cl. 119—33)

The present invention relates to battery brooders wherein all of the operating parts are simple and easily removed and attached, thus providing convenient means for cleaning and interior inspection, and wherein the feeding and watering panels may be easily adjusted to suit the feeding and drinking habits of the chicks as they develop.

The principal object of the present invention, generally stated, is to provide a battery brooder which is light, simple, efficient, and easily handled by the attendant.

An object of the present invention is to provide a hover, the ends of which are easily adjusted as to distance from the floor or lifted for inspection of the space under the hover and means whereby the hover may be electrically heated, and connected to a circuit by means of an extension cord and plug so the hover may be removed by simply disengaging four hooks and the extension socket.

A further object of the present invention is to provide simple means for adjusting the ends of the hover individually as to height, and to provide these means with stops whereby the hover cannot be lowered below a predetermined position, thus to prevent injuring the chicks by accident.

To these and other useful ends, our invention consists of parts, combinations of parts, or their equivalents, and mode of operation, as hereinafter set forth and claimed and shown in the accompanying drawings in which:

Fig. 3 is a top view of the hover, illustrating its supporting and adjusting means.

Fig. 4 is a side view of the hover and parts as shown in Figure 3.

Fig. 5 is a transverse section of the feed trough illustrating its position on a fraction of the brooder frame and its panel in its closest adjustment.

Fig. 6 is a transverse section of the watering trough, showing it in position on a fraction of the brooder frame and illustrating its panel in a medial position of adjustment and also illustrating the panel in dotted lines adapted to close the end of the compartment when the watering trough is removed.

Fig. 7 is a transverse sectional view of the frame corner posts, illustrating one of the posts as supplied with electric wires and sockets used for making a plug-in connection to the hover.

Fig. 8 is a fractional elevational view of the post shown in Figure 7, having the cover removed, illustrating two of the sockets in position and connected to the cables.

Fig. 9 is a transverse sectional view of one of the compartments taken directly in front of the hover and illustrating the means for separating the two ends of the compartment.

Figure 1:
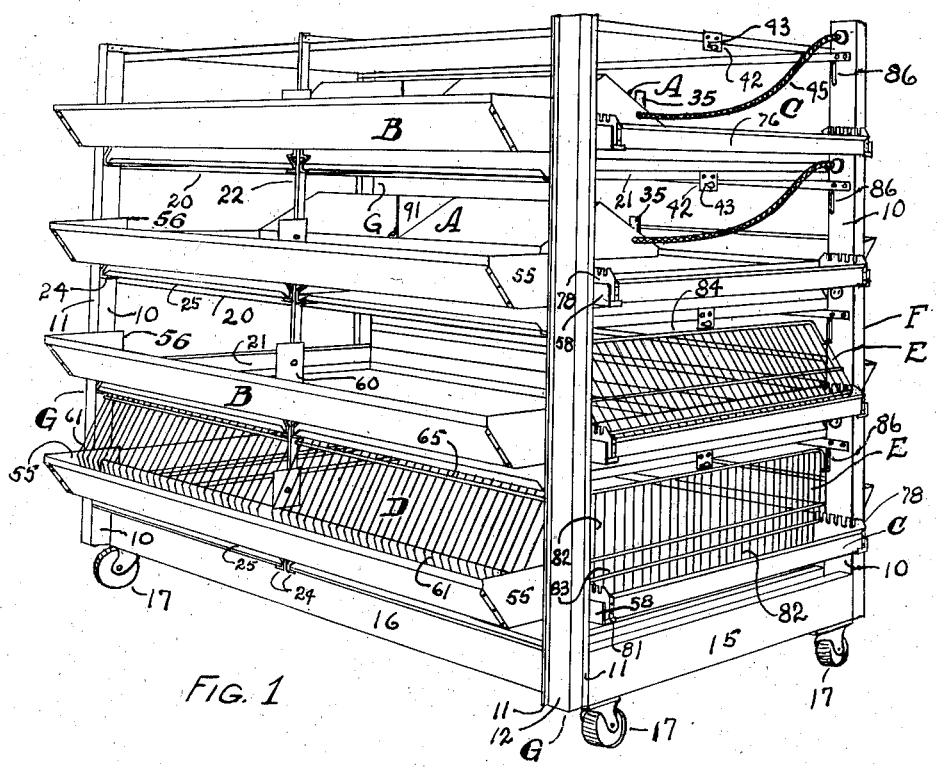
Fig. 1 is a perspective view of our improved battery brooder with the feed and watering troughs in position but having all but one of the feed trough panels removed and illustrating two of the watering trough panels in different adjusted positions.

As thus illustrated, the hovers are designated in their entireties by reference characters A, the feed troughs are designated by reference character B and the watering troughs are designated by reference characters C, the feed trough panels are designated by reference character D and the watering trough panels are designated by reference character E. The corner posts of the brooder are designated by reference characters F and G.

Posts F and G are similar; post F however being fitted with cables and plug-in sockets as illustrated in Figures 7 and 8. Posts F and G are formed by means of L-shaped members 10, having inturned flanges 11—11 on their outer edges and outer members 12 having flanges 13—13 adapted to slidably fit under flanges 11.

Members F and G are assembled by moving member 12 endwise into member 10; thus forming rectangular corner posts for the brooder, one post being fitted with cables and suitable sockets before member 12 is placed into position.

Transverse end base members or plates 15—15 are secured to the lower ends of posts F and G and side base plates 16—16 are secured to these posts in a similar manner, thus, as illustrated, the bottom of the lowest compartment is positioned slightly above the top edges of the base plates which act to stiffen the corners of the brooder and provide suitable fastenings for caster rollers 17, whereby the brooder may be easily moved about on the floor of the building.

We provide side bars 20 between the corner posts forming a dividing line between the compartments. The brooder is considerably longer than it is wide. It is therefore necessary to provide intermediate posts 22 to which members 16 and 20 are secured. The principal object of these intermediate posts will hereinafter appear.

On opposite sides of members 22 and on the inside of the corner posts we provide transverse members 21 which are shaped as illustrated, having bottom ledges 24 which rest on members 20. The ends of the droppings pans 25—25 slidably rest on ledges 24. Ledges 26 are provided a short distance above ledges 24 on which the ends of the wire netting floor 27 slidably rest.

The upper edges of members 21 are preferably bent downwardly and outwardly as at 28. Thus droppings will be caused to fall directly into the droppings pans a slight distance from the ends of the pans for purposes which will be apparent. Members 21 form a transverse connection between the corner posts and between members 22. Thus it will be seen that members 25 and 27 may be removed and replaced drawer-like from the side of the brooder. Clearly members 20, 21 and 22 cooperate with the corner posts to form a substantial frame.

We provide hover A which is the subject matter of application Serial No. 352,876, filed August 16, 1940, which has become Patent No. 2,266,934, issued December 23, 1941, which is provided with spaced brackets 35, two on each end of the hover having openings in their upper ends for the reception of loops 36 formed in the ends of cables 37. We provide cross bars or cable guideways 38 around which cables 37 extend (see Figures 3 and 4). Cables 37 terminate in loop connections to the ends of a plate 39. The outer edge of member 39 is V-shaped and is provided with an opening in the apex as at 40 to which a chain 41 is secured, the chain extending loosely through a bracket 42 which is secured to the center of end members 21 (see Figures 1 and 2). The opening in member 42 is keyhole shaped as at 43 so the chain may be slipped into the narrow part and locked into position.

The weight of the hover normally will be held up by the chains, therefore when the chains are loosened, for moving the hover, the hover may accidentally drop down to the floor of the compartment. I provide means to prevent this in the form of clamps 44 which may be secured to any one of the links on the free end of the chain (see the various figures). Thus, when the clamp is secured to the chain in the right position so the hover may be lowered to its lowest practical position for the chicks, if the chain should become released, accidentally, the hover would not drop on the floor of the compartment and perhaps injure a number of chicks.

It will be seen that the hovers will be maintained at a transverse level and can be lifted at will and locked in any desired position. The hovers are provided with extension cables 45 having end plugs 46 which are adapted to be inserted in sockets 47 which are secured to member 10 of corner post F and extend through openings in this member.

Clearly by disengaging clamps 44 and removing plugs 46, the hover may be removed from the compartment for cleaning, inspection and disinfecting purposes; members C and E being removed for the purpose, as will hereinafter appear.

Members 10 are provided with suitable openings for the reception of sockets 47 with their binding posts on the inside. Cables 48 and 49 may pass from one end of post F to the last socket in the post and the cables connected to the binding posts, as illustrated in Figures 7 and 8. These connections are made before member 12 is placed into position.

It will be seen that we have provided convenient means for connecting the hovers to the electric circuit and that a portion of the electric circuit is inclosed within post F.

Referring now to Figure 5 wherein we illustrate a transverse section of trough B and a fraction of the frame. This trough is preferably shaped as illustrated in this figure and in Figure 1 having end members 55 with projections 56. The projections are provided with upwardly extending slots 57 adapted to loosely embrace brackets 58 which are secured to posts F and G.

It will be understood that the bottom of trough B is positioned slightly above the horizontal plane of the top of member 27 so this member may be removed without disturbing member B.

We provide two wire panels D for each trough which are arranged to occupy the space between members 22 and the corner posts. Member D, as will be noted by scrutinizing Figure 5, extends outwardly and downwardly, thus leaving a triangularly shaped opening between this member and the top of the feed trough. To avoid the possibility of the chicks escaping through this opening, we secure a plate 60 to member 22.

Member D comprises horizontally spaced rods 61 being secured together near their bottom ends by rods 62, their ends extending a short distance past the end rods 61 and being adapted to rest in spaced slots 63 in brackets 64. Thus there will be a bracket at each end of panel D which rests on the bottom of the feed trough. Members 62 may be dropped into any one of the slots in member 64 so as to regulate the opening to the feed which is made accessible to the chicks. For very small chicks, the opening is made narrow enough so the chicks cannot get into the feed trough.

The upper ends of rods 61 are secured together by a transverse rod 65 which is located a short distance from the upper ends of members 61.

Wire members 67 are bent around members 65, having upturned ends 68 and downwardly extending ends 69 being bent sidewise into a hook as at 70. Thus it will be seen that hook 70 may be disengaged and member 69 lifted so member 68 will be lowered far enough to pass under member 20 and member D swung outwardly on members 62 as an axis and providing access to the interior of the compartment or for the purposes of adjusting the lower end of this member or tending to the chicks.

If it is desired to remove trough B, member 68 may be disengaged and the lower end of member D moved to a position in rear of member 58 and member 68 again caused to engage member 20; thus to form a closure for the compartment.

Figure 2:
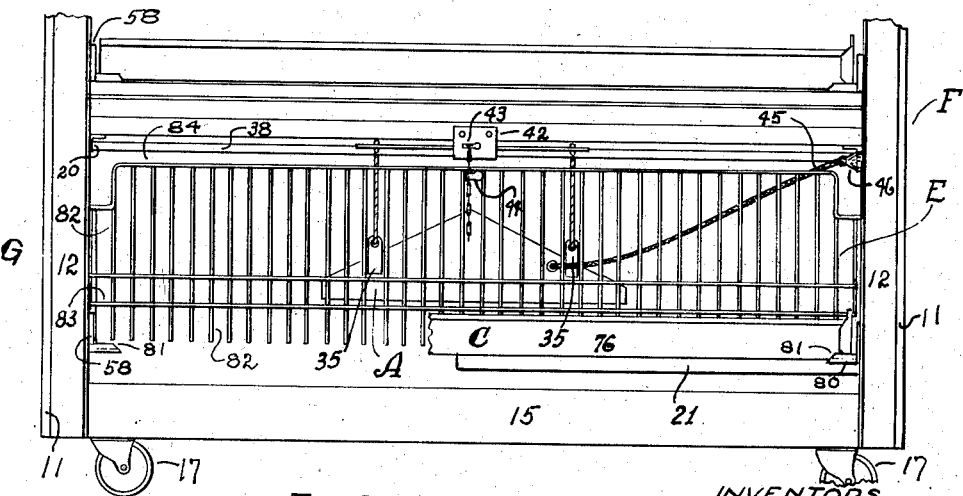
Fig. 2 is an end view of the device as illustrated in Figure 1, showing the bottom compartment only and a fraction of its watering trough.

We provide water troughs C as illustrated in Figures 1, 2 and 6. These troughs are provided with side members 75 and 76 and a bottom 77 and end members 78, the end members being slightly higher than members 75 and 76 and having therein a series of slots 79.

Member 58 is secured to the corner posts, as illustrated in Figures 5 and 7, and is provided with an L-shaped member 80 having upturned ends as at 81, forming a rest for the ends of the watering trough C (see Figures 1, 2, 5, 6 and 7).

We provide a watering trough panel or closure E for the end of each compartment (see Figures 1 and 2). This panel comprises longitudinally spaced rods 82 which are held together near their lower ends by means of a transverse rod 83, the ends protruding a short distance past the end rods of member E and being adapted to rest in any one of slots 79 (see Figure 6).

The upper ends of members 82 are secured together by means of a transverse rod 84. This rod is shaped as illustrated, and having ends which extend a distance past the ends of the end rod of member E and then being turned at right angles as at 85 (see dotted lines in Figure 6). The ends of rods 84 are adapted to extend through slots 86 formed in the inner faces of the corner posts. These ends are inserted in the slot by raising member E to a horizontal position so members 85 will pass through the slots, after which member E is free to rise and lower for adjustments in slots 79 and for releasing this member so it may be positioned as illustrated by dotted lines, after which trough C may be removed and the closure still maintained. If, however, it is desired to have access to the interior of the compartment, member E may be swung inwardly or outwardly on rod 84 hinge-like.

Clearly the lower end of member E may be positioned in the trough so as to prevent the smallest chicks from getting into the trough and as the chicks grow, the adjustment may be moved outwardly so as to make it more convenient for the birds to have free access to the water in the trough.

Member 80, it will be noted by scrutinizing Figure 6, is positioned a slight distance above the top of member 27 so it will not interfere with the moving in and out of this member, as already described.

It will be seen that by removing trough C, and panel E, hover A may be removed from its compartment as already described and that practically everything associated with the brooder, except the skeleton frame, may be easily removed and replaced.

By referring to Figures 4 and 9, it will be noted that we secure a downwardly extending plate 90 to the bottom of member A which fits loosely between members 21. We also preferably provide plates 91 on the top of member A, the upper edges terminating so the hover may be raised to its highest practical position (see Figure 9).

We provide vertically positioned wire panels 92, the upper and lower ends extending between members 21 and being held into position so as to form partitions which cooperate with members 90 and 91 to form two separate compartments, so each group of chicks will have access to a water trough and one end of the feed trough.

It will be understood that we may attach a thermally controlled switch to hover A in any desired position and have it connected to the electric circuit so the compartment occupied by the hover may be maintained at a predetermined temperature, or at least so the temperature under each hover may be controlled. This method is too well known to require further description.

Clearly many minor detail changes may be made in the present invention without departing from the spirit and scope of this invention as recited in the appended claims.

We claim:

1. A device of the class described, comprising an elongated transversely rectangular frame having means to form vertically spaced compartments having droppings pans and wire mesh floors, an elongated hover positioned longitudinally in each of said compartments having spaced supporting cables secured thereto and near the corners thereof, each of said cables extending vertically and then outwardly over fixed guideways, said cables being secured at their outer ends to anchor plates, chains secured to said plates midway the length of the plates, and brackets having key-shaped openings transversely centrally positioned at the ends of said compartments through which said chains extend, whereby the ends of said hover may be manually raised or lowered or locked individually at predetermined heights.

2. A device as recited in claim 1 including; stops secured to the free ends of said chains whereby the lowest position of said hover may be limited to a predetermined height.

3. A device of the class described, comprising an elongated frame having corner posts and vertically spaced side and end bars, vertically positioned supplemental posts secured to said side bars midway their lengths, side and end panels and means whereby droppings pans and wire mesh floor members may be inserted and removed transversely drawer-like adjacent said side bars, said floors and side and end panels forming compartments, an electrically heated hover positioned in each of said compartments, said posts each comprising a main L-shaped member and another L-shaped member, means whereby said last L-shaped member may be telescoped on said first member to thereby form a tube which is rectangular in cross section, sockets secured in one of said L-shaped members, one adjacent each of said compartments, and wires in one of said rectangular tubes having a connection to each of said sockets, each of said hovers having a cable with a plug on its free end adapted to be engaged by the adjacent socket.

4. A device of the class described, comprising a horizontally rectangular frame formed by vertical corner posts and bars therebetween, means to form vertically spaced compartments having droppings pans and wire mesh floors, an electrically heated hover positioned in each of said compartments, one of said posts comprising a main angle bar, sockets secured to said angle bar, one adjacent each of said compartments, a supplemental angle bar secured to said first angle bar whereby an inclosure rectangular in cross section is formed, and wires in said inclosure having connections to each of said sockets, each of said hovers having a cable with a plug on its free end and adapted to be engaged by the adjacent socket.

WILLIAM M. WILLETT.
JOHN B. OLSON.
GEORGE T. MARKEY.